United States Patent [19]
Crooks

[11] 3,731,572
[45] May 8, 1973

[54] MITER BOX

[76] Inventor: Richard S. Crooks, 2277 Newman Dr., Trenton, Mich. 48183

[22] Filed: Sept. 28, 1970

[21] Appl. No.: 75,900

[52] U.S. Cl. .....................83/471.3, 83/522, 83/523
[51] Int. Cl. .............................................B27b 27/08
[58] Field of Search......................143/90, 87, 169, 143/6 G, 6 J, 43 E, 47 F

[56] References Cited

UNITED STATES PATENTS

| | | | |
|---|---|---|---|
| 3,485,275 | 12/1969 | Boudreau | 143/90 X |
| 3,410,324 | 11/1968 | Thompson | 143/6 G |
| 140,267 | 6/1873 | Green | 143/6 J |
| 3,450,177 | 6/1969 | Siegal et al. | 143/6 G |
| 3,586,075 | 6/1971 | Larsen | 143/90 X |
| 3,516,457 | 6/1970 | Winters | 143/6 G |

FOREIGN PATENTS OR APPLICATIONS

| | | | |
|---|---|---|---|
| 503,487 | 4/1939 | Great Britain | 143/47 F |
| 627,815 | 10/1927 | France | 143/90 |

*Primary Examiner*—Andrew R. Juhasz
*Assistant Examiner*—James F. Coan
*Attorney*—David A. Maxon

[57] ABSTRACT

The invention relates to an improved miter box. It comprises a board for supporting a work piece that is underneath the work piece; an arm rotatable on the plane of the board; a pair of parallel rails fixed to the board for guiding a circular saw; slots in the rails through which the work piece passes; the work piece being guided along the arm towards the saw; means on the board for designating the angle of the arm with the path of the saw; and means fixing this angle by selectively maintaining a rigid connection between the arm and the board.

7 Claims, 5 Drawing Figures

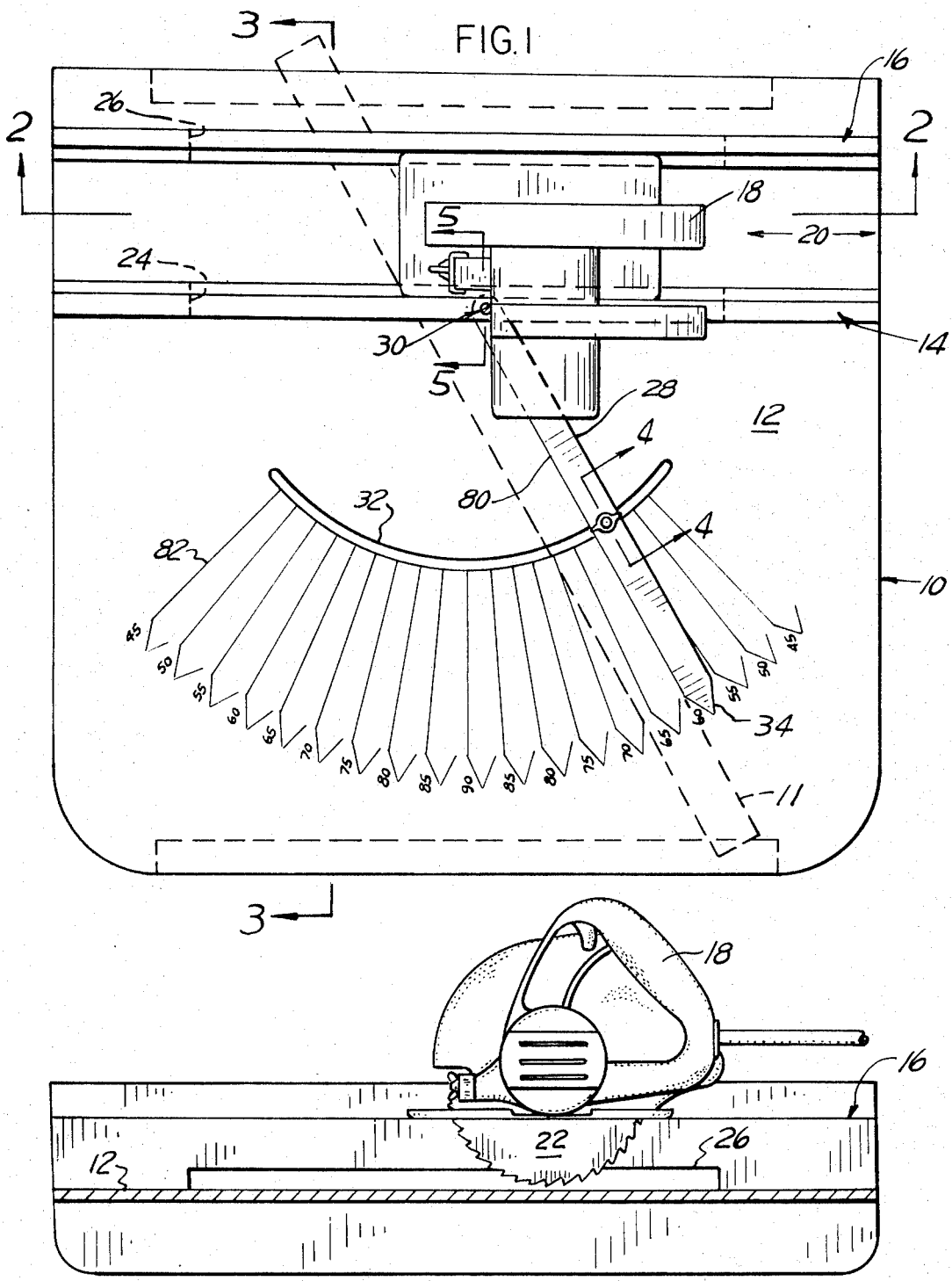

INVENTOR
RICHARD S. CROOKS
BY David A. Maxon
ATTORNEY

MITER BOX

This invention relates generally to an improved miter box. More specifically this invention relates to an improved miter box that has means for choosing and fixing an angle to cut on a work piece and that allows the work piece to be fully observable throughout the operation of cutting.

In the prior art, there have been a number of devices for cutting angles of wooden work pieces. Some of these, such as those disclosed in U.S. Pat. No. 2,633,162 issued to Neuenschwander, U.S. Pat. No. 2,876,808 issued to Lindheim, and U.S. Pat. No. 2,620,835 issued to Barnhart, disclosed a rotatable guide for a saw rather than a rotatable guide for a work piece. These disclosures indicate a complicated and expensive apparatus for controlling sawed angles on work pieces because they have to support the saw which is usually heavier than the work piece itself and because the saw moves at a relatively high rate of speed relative to the movement of the work piece during the operation of sawing.

It is an object of this invention to provide an improved miter box that is relatively uncomplicated and relatively inexpensive t4 manufacture and maintain.

U.S. Pat. No. 2,677,399 issued to Getsinger discloses a pair of parallel boards; an arm hinged on a rail interposed between these boards; the work piece inserted between these boards; an arcuate slot in the top one of these boards; a wing nut and bolt, with the bolt projecting through the slot and fixed to the arm for fixing a desired position, a circular saw adapted to slide along a static rail, the work piece to slide flush along the arm between the boards for positioning with respect to the path of the saw. The difficulty with this disclosure is that one cannot set and monitor and manually closely control with ease the positioning of the workpiece during sawing.

Accordingly it is an object of this invention to provide an improved miter box whertin the work piece can be readily positioned with respect to the saw and be relatively more fully exposed to view and to manual control during the operation of sawing.

These and other objects of this invention are achieved by an improved miter box. This box comprises a board supporting the work piece and a pair of rails for guiding the path of a circular saw. Slots are provided near the center of the rails for the work piece to pass through. An arm rotatable in a plane parallel to thP plane of the board about an axis passing through one of the rails is provided for guiding the work piece towards the cutting path of the saw. An arcuate slot is provided in the board that has a radius that passes through the aforementioned axis. Means are provided for fixing the arm at a desired angle with respect to the path of the saw. This means projects through the board through the arcuate slot. The work piece slides flush along the arm and is fully observable and easily manually controlled for position during the operation of cutting. The work piece passes over the arcuate slot.

IN THE DRAWINGS

FIG. 1 is a top plan view of the preferred embodiment of this invention.

FIG. 2 is a transverse sectional view along the lines of 2—2 of FIG. 1.

Figure 3:
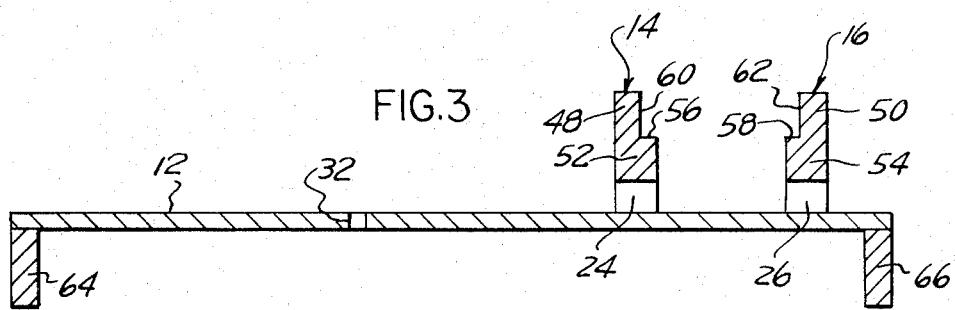
FIG. 3 is a cross-sectional view along the lines 3—3 of FIG. 1.

Before explaining the present invention in detail, it is to be understood that the invention is not limited in its application to the details in construction and arrangement of parts illustrated in the accompanying drawings since the invention is capable of other embodiments and of being practiced or carried out in various ways. Also, it is to be understood that the phrases and terminology employed herein is for the purpose of description and not limitation.

AS SHOWN ON THE DRAWINGS

It FIG. 1, the preferred embodiment of the invention is shown. It is a top plan view of an improved miter box 10. A broad flat board 12, preferably wood, is provided upon which the work piece 11 (shown in phantom) is supported. A pair of parallel rails 14 and 16, preferably wood, are fixedly attached, preferably by nails or glue or both, to the board 12. These rails suport a circular saw apparatus 18. They also allow but limit translation of the saw apparatus 18 along a horizontal path indicated by the double arrow 20. This path restricts the cutting edge of the circular saw 22 to a vertical plane perpendicular to the board 12 that intersects the board in a horizontal line.

A pair of slots 24 and 26 are provided in the lower middle portions of rails 14 and 16 respectively to allow the work piece 11 to pass therethrough.

An arm 28 is rotatably attached to the board 12. This attachment made by means of a nut and bolt assembly 30 that defines an axis perpendicular to the plane of the board and passing through the middle of rail 14 and slot 24. An arcuate slot 32 is provided in the board 12. This slot has circular arc boundaries along the length thereof with coincident radii which intersect the axis of the arm rotation attaching means 30. These radii are indicated by illustration 82 on the board designating a plurality of angles of these radii with respect to the cutting path of the saw. The arm 28 has one end thereof 34 shaped as a point to coincide with the point illustrations of these radii. Thus the arm can be visually observed and manually positioned to coincide with a desired angle of cutting by use of the illustration of the radii of the board and the convenient shape and positioning of the arm with respect to those radii illustrated.

Means are provided in a form of a bolt and wing nut assembly 36 to firmly fix the position of the arm with respect to the board when a desired angle of cutting is selected. The operator merely tightens the wing nut, thereby pressing the arm toward the board because the head of the bolt being in contact with the underside of the board, the bolt passing through the arcuate slot 32. This can be readily appreciated in FIG. 4 where tightening assembly 36 is illustrated in detail.

In its preferred embodiment, the invention comprises a wing bolt 38 threaded to a bolt 40 which passes through the arm 28 of the arcuate slot 32. The head of the bolt 42 is underneath the board 12. Washers 44, 46 are placed between the underside of the wing bolt 38 of the top surface of the arm 28 and the underside of the head of the bolt 42 and the bottom surface of the board 12, respectively.

Figure 4:
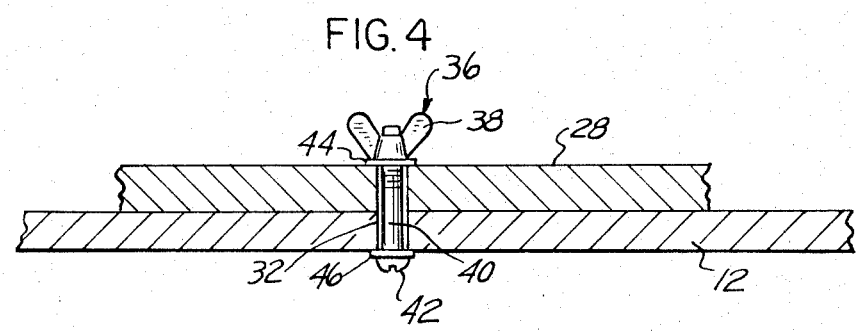
FIG. 4 is a partial cross-sectional view along the lines 4—4 of FIG. 1.

In other alternative embodiments of this invention, the tightening assembly 36 comprises a carriage bolt rather than the type of bolt 42 illustrated in FIG. 4.

Further details of the rails can be seen from FIG. 3. Each of the rails 14 and 16 have upstanding portions 48,50 respectively and thicker lower portions 52,54, respectively, forming ledges 56,58 respectively, with inward upper vertital surfaces 60,62 of top rail portions 48,50 respectively. It can also be appreciated in FIG. 3 that the board 12 is supported by leg portions 64,66 that raise the entire structure to allow curvilinear motion of the bolt head 42 on the bottom of the board 12 through various angles.

Figure 5:
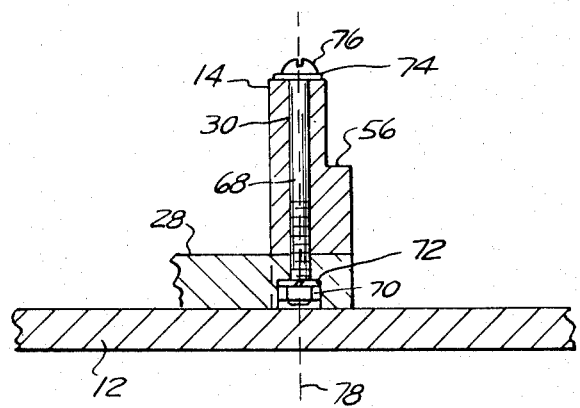
FIG. 5 is a partial cross-sectional view along the lines 5'5 of FIG. 1.

In FIG. 5 is illustrated the attachment means 30 of the arms 28 of the board 12. A threaded bolt 68 passes through the rail 14 on the arm 28 and is secured by a bolt 70 within a cavity 72 on the inside of one end of the arm 28. A washer 74 is provided between the inside of the head 76 of the bolt 68 and the topmost surface of the rail 17. From this illustration it can be appreciated that the aformentioned attachment means 30 dfines an axis 78 about which the arm 28 rotates in a plane parallel of the plane of the board 12. It can also be appreciated that the ledge 56, as well as the ledge 58, are the surfaces upon which the saw apparatus 18 slides during the sawing operation.

In alternative embodiments of this invention each of the rails 14 and 16 have the same width of upstanding portions 48,50 respectively as the lower portions 52,54, respectively, thus having a 0ubstantially rectangular cross section throughout the length. In other words, viewing the portions 48,50 in the preferred embodiment as rail lip pieces, in alternative embodiments of this invention, the rail lip portions are removed.

From the aforementioned description it can also be appreciated that means have been provided for selecting the angle of sawing by fastening the arm 28 to the board 12. In the operation of the preferred embodiment of this embodiment of this invention, the work piece 11 lies flush along one surface 80 of the arm 28 above the arcuate portion 32 of the board 12, and is fully observable and manually positionable during the sawing operation. It can also be appreciated that the surface 80 of the arm 28 is parallel to the angle of the radius indicated in the illustration 82, so that the angle selected by positioning pointed end 34 of the arm 28 with respect to the illustrated angles 82 of the board also determines the angle of the surface 80 with respect to the cutting path of the saw 26.

I claim:

1. In a miter box apparatus, the improvements comprising:

a board supporting the work piece;

a pair of parallel rails fixed on the top surface of the board; said rails supporting and defining a horizontal translational path for movement of a saw member sliding thereon;

an arm journaled on top of said board and operable to rotate, about the axis of journaling, in a plane parallel to the plane of the board;

an illustration and designation, on the top surface of said board, of lines indicating angles of one surface of said arm with said path of said saw member;

said surface, said board, said illustration and designation and a substantial portion of the length of the work piece being readily observable during sawing;

said apparatus allowing a substantial portion of the length of the work piece to be manually controlled for position during sawing;

said board, rails and arm being made of wood and said illustration and designation being affixed to the top surface of the board;

said axis of journaling passing through one of said rails;

said rails having slots in the middle portions thereof allowing the work piece to pass therethrough;

a depression in the underside of said arm at one end of the arm enclosing a portion of said journaling means;

said illustrationand designation designating said angles by illustration of a shape of an arrow, and the end of the arm, remote from said axis of journaling, being shaped in the form of an arrow substantially conforming to the arrow of the illustration and designation aforesaid;

an arcuate slot in said board having parallel circular arc segments defining sides thereof that have co-incidental radii in the plane of the top surface of said board and also being parallel to radii in the plane of the top surface of the board intersecting said axis of journaling of said arm;

and means selectively fixing the position of the arm with respect to the board, said fixing means having portions extending through said arcuate slot, and feet underneath said board supporting at a raised portion above the surface upon which the feet rest.

2. The apparatus of claim 1 and means selectively operable to fix a selected angle of said surface of said arm with respect to the path of said saw member.

3. The apparatus of claim 1 wherein said saw member comprises a circular saw driven by a motor, the motor and the circular saw operable to slide on said rails.

4. The apparatus of claim 1 and feet underneath said board supporting said board in a raised position such that the bottom surface of said board is above the surface that the feet rest on.

5. The apparatus of claim 1 wherein said board, rails, and arm are made of wood and said illustration and designation comprises a decal affixed to the top surface of said board.

6. The apparatus of claim 1 wherein said board, rail, and arm, are made of wood and the illustration and designation is painted on the top su7face of said board.

7. The apparatus of claim 1 wherein said arm fixing means comprises a bolt passing through said arcuate slot and one end of said arm, the head of the bolt engaging the bottom surface of said board, the tail of the bolt being above the top surface of said arm, and a wing nut threaded on the tail of said bolt and operable to be screwed toward the head of the bolt.

* * * * *